(12) United States Patent
Windholz et al.

(10) Patent No.: US 6,273,024 B1
(45) Date of Patent: Aug. 14, 2001

(54) MANAGED FEEDING SYSTEM

(76) Inventors: Arthur G. Windholz, HC01 Box 6A;
Lester D. Windholz, HC01 Box 6, both
of Ogallah, KS (US) 67656

( * ) Notice: Subject to any disclaimer, the term of this patent is extended or adjusted under 35 U.S.C. 154(b) by 0 days.

(21) Appl. No.: 09/468,383

(22) Filed: Dec. 20, 1999

(51) Int. Cl.⁷ ..................................................... A01K 1/10
(52) U.S. Cl. ................................................................ 119/60
(58) Field of Search ............................. 119/60, 510, 513

(56) References Cited

U.S. PATENT DOCUMENTS

| | | |
|---|---|---|
| 1,839,673 * | 1/1932 | Hartmann ............................ 119/513 |
| 3,906,902 | 9/1975 | Rose . |
| 3,913,529 | 10/1975 | Leigh, Jr. . |
| 4,002,147 * | 1/1977 | Feterl ..................................... 119/60 |
| 4,148,278 | 4/1979 | Anderson . |
| 5,355,834 | 10/1994 | Blazek . |
| 5,467,737 * | 11/1995 | Weelink ................................. 119/60 |

* cited by examiner

Primary Examiner—Robert P. Swiatek
(74) Attorney, Agent, or Firm—Chase & Yakimo, L.C.

(57) ABSTRACT

A managed feeding apparatus that limits access to feed by livestock according to operator-selected positions which allows the operator to control the amount of feed available and the time the feed is available to the livestock, and reduces waste of the feed.

19 Claims, 2 Drawing Sheets

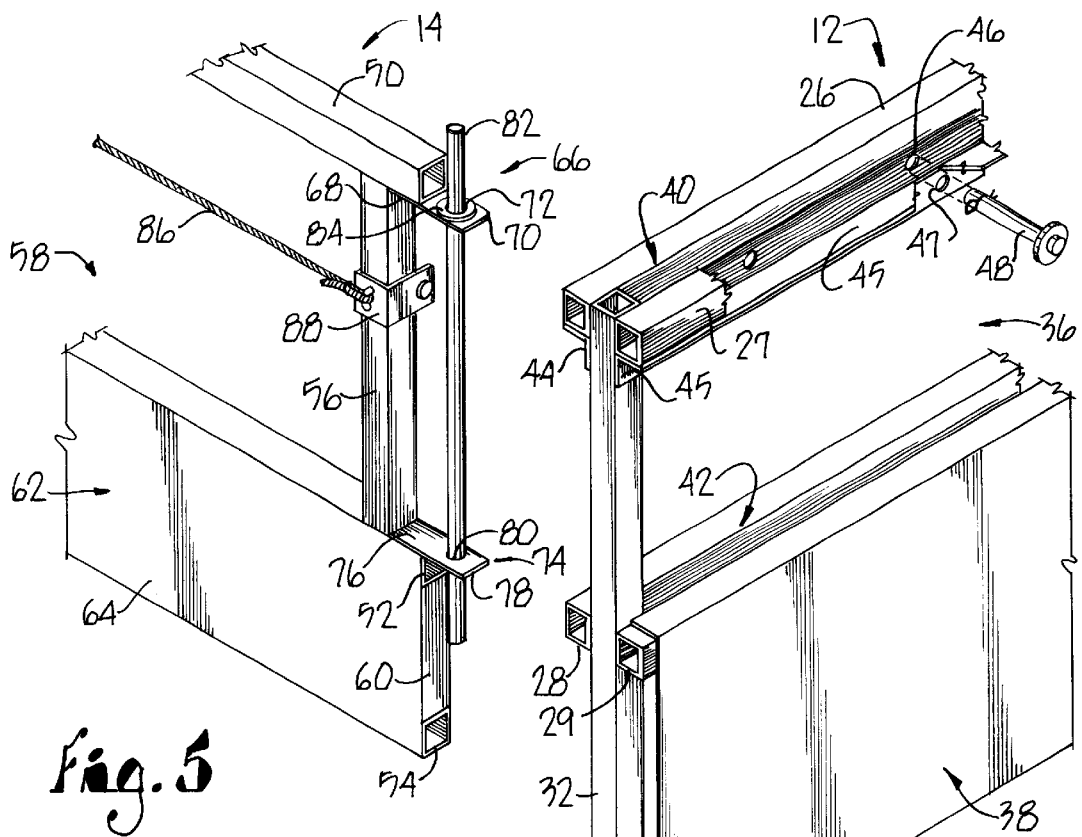
Fig. 5
Fig. 6
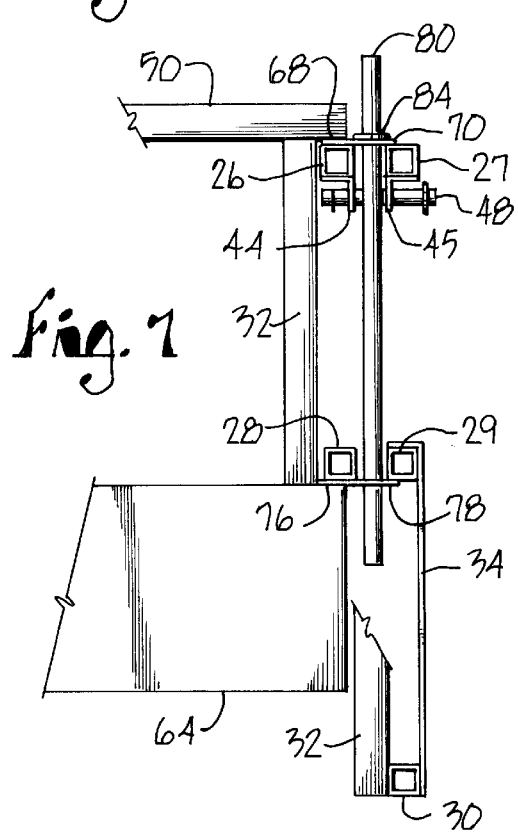
Fig. 7

MANAGED FEEDING SYSTEM

BACKGROUND OF THE INVENTION

This invention relates to an apparatus for feeding livestock and, more particularly, to an apparatus for managed feeding of tub ground feed or hay to cattle or other livestock.

Feeding cattle is commonly done by dropping or stacking hay or forage in the field or in a feed yard where cattle have access to the hay. The cattle are allowed to eat continuously. The cattle always try to get closer to the hay stack and in doing so, they scatter and damage or destroy the forage by stamping it into the ground so that much of the hay is wasted. Fixed feeding bins reduce the waste but require that the farmer or rancher frequently rake the hay to a position within reach of the livestock.

Feeding devices have been proposed that limit access to the forage by placing the round or square bales or ground forage within a feeding pen that the cattle or other livestock may reduce in size or move as they consume the hay. An example of one such device is disclosed in U.S. Pat. No. 3,913,529 to Leigh. A problem with such devices is the livestock can eat continuously and the forage may still be scattered or spilled from the pen and thus wasted as the device is moved or reduced in size.

SUMMARY OF THE INVENTION

It is, therefore, the primary object of the present invention to provide an apparatus for selectively controlling the access of livestock to hay or forage.

Another important object of the present invention, as aforesaid, is to provide an apparatus for managed livestock feeding which reduces feed waste.

Yet another important object of the present invention is to provide an apparatus that allows control of calving by providing access of the livestock to the feed only when so configured by the operator.

Still another important object of the present invention is to provide an apparatus for managed livestock feeding which reduces the time required for daily feeding of livestock.

A further object of the present invention is to provide an apparatus for managed livestock feeding that is easy to operate without tools.

Still a further object of the present invention is to provide an apparatus for managed livestock feeding that is expandable to accommodate various herd sizes.

These and other objects of the present invention are achieved by providing a livestock feeder which has an enclosed area. Hay bales, ground feed or other forage are placed in the enclosed area to limit access to the feed by the livestock. The enclosed area is generally rectangular with two stationary sides and two moveable ends. The size of the enclosed may be expanded by adding center sections and additional moveable end members.

The stationary sides consist of a pair of spaced-apart top rails, a pair of spaced-apart middle rails and a single bottom rail that rests on the ground the full length of the stationary side. The space between the top rails forms a channel or track therebetween. Likewise, the space between the middle rails forms a channel or track therebetween. The upper and lower channels are in vertical alignment. The stationary sides provide an opening between the top and middle rails and a solid panel extending from the middle rails to the bottom rails.

The moveable ends consist of a top rail a middle rail and a bottom rail. A solid panel extends between the middle rail and bottom rail. A rod extends between the top and middle rails through holes in upper and lower axially-aligned brackets at each end of the moveable ends.

The feeder is assembled by aligning the holes in the upper and lower brackets of the moveable ends with the upper and lower channels of the stationary sides respectively. The rods are inserted into the bracket holes through the channels securing the stationary and moveable ends together. Thus, when the feeder is assembled, the rods slide within the upper and lower channels of the stationary sides and the moveable end is suspended above the ground.

The sides have an open area through which livestock can eat the forage through the sides, and a solid panel along the lower portion of the sides to keep the forage in the enclosed area and prevent the livestock from stamping on and scattering the forage as they eat. The moveable end panels are slideably attached at their ends to the stationary panels so that the movable sides may be moved toward the forage stack as the feed is eaten by the livestock.

Control pins in the stationary sides limit the movement of the moveable ends so that feeding may be controlled by the operator. The control pins are inserted in a series of space-apart holes along the upper rails of each of the stationary sides and extend across the upper channel to stop the moveable ends when contacted by the rods. The holes and control pins establish positions selectable by the operator to limit movement of the end panels toward the center of the enclosed area, thus controlling the amount of feed accessible to the livestock.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 5 is a fragmentary perspective view of the end of a moveable end member.

FIG. 6 is a fragmentary perspective view of the end of a stationary side member.

FIG. 7 is a fragmentary elevation view of a corner of the controlled feeder.

DETAILED DESCRIPTION

Figure 1:
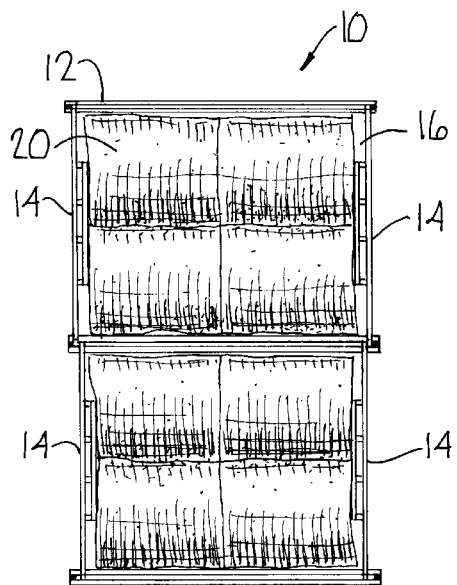
FIG. 1 is a plan view of the controlled feeder with a center section shown with round hay bales.
Figure 2:
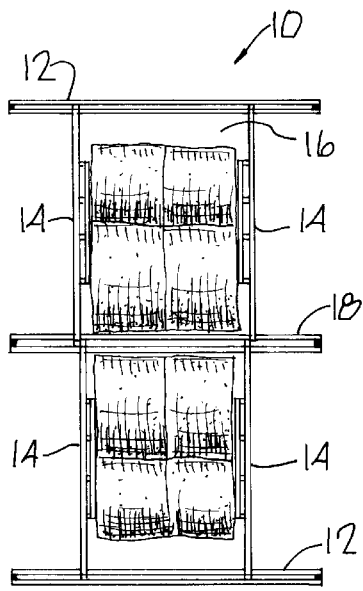
FIG. 2 is a plan view of FIG. 1 with the hay bales partially eaten around the periphery of the controlled feeder and the moveable ends adjusted toward the partially consumed hay bales.
Figure 3:
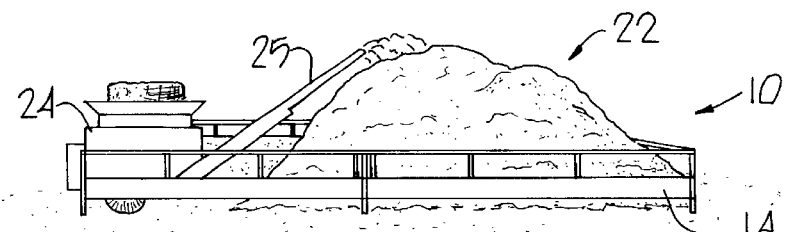
FIG. 3 is an illustration of the controlled feeder being filled by a tub grinder.
Figure 4:
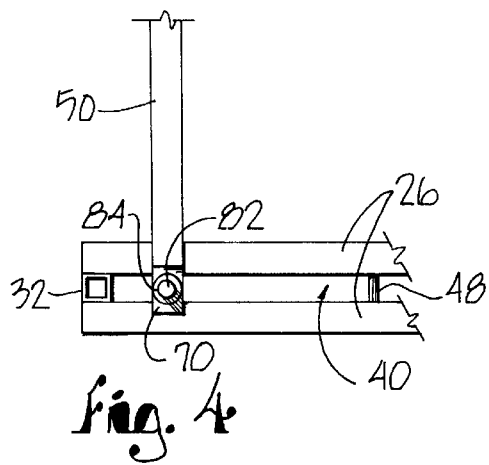
FIG. 4 is a plan view of a corner of the controlled feeder.

Turning more particularly to the drawings, FIGS. 1–3 illustrate a managed feeder generally referred to by the numeral 10. Managed feeder 10 consists of stationary side members 12 and moveable end members 14 which define an enclosed area 16. A center member 18 may be added along with additional moveable members 14 to expand the livestock feeder and enlarge enclosed area 16. Large round hay bales 20 or loose or ground forage 22 or other feed ground by tub-grinder 24 may be placed in enclosed area 16. Managed feeder 10 provides limited access to the bales 20 or ground forage 22 by livestock around the periphery of enclosed area 16 (FIG. 2).

FIGS. 1–2 illustrate a double managed feeder 10 assembled with two side members 12, four end members 14 and a center member 18. To expand managed feeder 10, additional sets of two end members 14 and one center member 18 may be added. In the preferred embodiment, the size of a single managed feeder 10 is approximately twenty-four feet on a side or alternatively, twenty-four feet by thirty-two feet, although other sizes may be used.

Referring to FIGS. 4–7, the stationary side members 12 are each comprised of inner 26 and outer 27 upper horizontal members or rails, inner 28 and outer 29 middle horizontal members or rails, and a lower horizontal member or rail 30. Horizontal rails 26, 27, 28, 19 and 30 are affixed between vertical end member 32 at each end of side panel 12. A solid panel 34 is affixed between outer middle rail 29 and lower rail 30 thereby dividing stationary side panel 12 into an upper open section and a lower closed or covered section indicated at 36 and 38 respectively.

Horizontal members 26 and 27, and 28 and 29 are affixed to opposed sides of vertical end member 32 forming an upper and a lower channel or track respectively therebetween generally indicated at 40 and 42 respectively. A pair of L-shaped members or brackets 44 and 45 are affixed to a lower surface of the upper horizontal rail 26 and 27 respectively, extending inwardly to upper slot 40. L-shaped members 44 and 45 have axially-aligned, horizontally spaced-apart adjustment control apertures 46 and 47 adapted to receive a control pin 48 which spans upper channel 40 when engaged in axially-aligned apertures 46 and 47. In the preferred embodiment, apertures 46 and 47 are spaced approximately one foot apart. It should be understood that additional control pins may be used such as to span the lower channel 42 when inserted in axially-aligned spaced-apart apertures (not shown) in horizontal members 28 and 29.

Moveable end members 14 are each comprised of upper 50, middle 52 and lower 54 horizontal members. An additional upper member 51 may be affixed to upper horizontal rail 50 to provide structural stiffening and support to moveable panel 14 (FIGS. 1–2). Horizontal members 50 and 52 are affixed to vertical end member 56 at each end of end panel 14 forming an upper open section generally indicated at 58. Vertical end members 56 are offset inwardly from each end of horizontal members 50 and 52. Horizontal members 52 and 54 are affixed to lower vertical end members 60 forming a lower closed section 62 covered by panel 64.

A cantilevered upper bracket 66 has a first end 68 affixed to a portion of the lower surface at the end of horizontal member 50 which extends beyond upper vertical end member 56, and a free end 70 which extends beyond the end of upper horizontal member 50. An aperture 72 extends through upper bracket free end 70. A cantilevered lower bracket 74 has a first end 76 affixed to a portion of the upper surface at the end of middle member 52 which extends beyond upper vertical end member 56, and a free end 78 which extends beyond the end of middle horizontal member 52. An aperture 80 extends through the lower bracket free end 78 in vertical axial alignment with aperture 72.

A retaining rod 82 is shown extending through apertures 72 and 80 in FIG. 5. A stop washer 84 is affixed to retaining rod 82 to hold retaining rod 82 in place. Cable 86 is secured to adjustable bracket 88 which is attached to vertical member 56 to restrict the area of upper open section 58 to accommodate different sizes of livestock. Generally, bracket 88 is adjusted so that cable 86 prevents smaller livestock such as calves from climbing through open section 58 into the open area 16.

Center member 18 is constructed in a like manner to stationary side member 12 except both the upper and lower sections corresponding to sections 36 and 38 are open.

In the preferred embodiment, all horizontal and vertical members or rails are constructed from two-inch square steel tubing although other materials and sizes may be used. Generally the affixed components are welded together but other methods of securing the members together may be used.

To assemble managed feeder 10, moveable end members 14 are slideably secured to stationary side member 12 at each end. The upper bracket 66 is placed over upper horizontal member 26 and lower bracket 74 is placed under middle horizontal member 28 until upper bracket aperture 72 and lower bracket aperture 80 are aligned with slots 40 and 42 respectively. Retaining rod 82 is inserted into aperture 72 through channels 40 and 42 and through aperture 80 slideably securing moveable end member 14 to stationary side member 12 forming a corner of managed feeder 10. Control pin 48 is inserted in the first set of adjustment control apertures 46 and 47 to prevent moveable end member from sliding beyond control pin 48. Each corner of managed feeder is likewise formed until area 16 is enclosed. When assembled, lower horizontal members 30 of stationary side members 12 rest on the ground the full length of each stationary side 12. Moveable end members 14 are suspended above the ground to provide clearance to slide each moveable end 14 toward the center portion of enclosed area 16.

In operating after managed feeder 10 is assembled as described hereinabove, enclosed area 16 is filled with hay bales 20, ground hay or forage 22. One of the moveable ends may be removed to allow placement of the bales 20 within enclosed area 16 and the enclosure thereafter completed (FIG. 1). Ground hay or forage 22 may be added to enclosed area 16 by bale grinder 24 with an extended boom or conveyor 25 to drop the hay in place (FIG. 3). Fixed panels 34 and 64 prevent the forage 22 from spilling from the managed feeder 10 when being filled.

When livestock come to managed feeder 10 to feed, the livestock stand around the periphery and stick heads through open areas 36 and 58 in side members 12 and 14 respectively. The periphery of the bales 20 or forage 22 is eaten to the extent that the livestock can reach through openings 36 and 58 (FIG. 2). Once a day, or as desired, the operator removes the control pins 48 from apertures 46 along each side of stationary side member 12 and inserts each control pin 48 in the next interior aperture 46. The operator then slides moveable end member 14 toward the interior of managed feeder 10 until each retaining rod 82 contacts the respective control pin 48 or until side 14 contacts hay bales 20 or forage 22, once again providing the livestock with access to the hay bales 20 or forage 22. The fixed panels 34 and 64 minimize spillage of feed from managed feeder 10 thus reducing waste. Managed feeder 10 may be refilled before it is empty to allow the operator to more effectively manage their time, especially during severe weather season.

The operator can also use managed feeder 10 to control calving of the livestock. By feeding the cattle once daily at dusk, the pregnant livestock are more likely to deliver offspring between 6 a.m. and 6 p.m. Survival rates of offspring are dramatically increased during daylight hours when supervision is available, thus increasing profits.

It is to be understood that while certain forms of this invention have been illustrated and described, it is not limited thereto, except in so far as such limitations are included in the following claims.

Having thus described the invention, what is claimed as new and desired to be secured by Letters Patent is as follows:

1. An apparatus for controlling the feeding of livestock with bulk feed stored in the apparatus, said apparatus comprising:

spaced-apart first and second stationary side panels, each having an open upper and a closed lower longitudinal section;

first and second moveable end panels, each having an open upper and a closed lower longitudinal section, and being slideably attached to said first and said second stationary side panels to present an enclosed area having a central portion, whereby said upper open section of each of said stationary and moveable panels provides limited access by said livestock to said bulk feed and said lower closed area of each of said stationary and moveable panels prevents said bulk feed from spilling from said enclosed area; and means on each of said first and second stationary side panels defining a series of spaced stops for each of said end panels establishing a corresponding series of operator-selectable positions for each end panel progressing inwardly along said side panels toward said central portion of said enclosure.

2. The apparatus as claimed in claim 1 wherein said first and second stationary side panels each further comprising a pair of upper spaced-apart horizontal members presenting a channel therebetween, each of said upper horizontal member having a lower surface, a pair of spaced-apart middle members presenting a channel therebetween, a pair of spaced-apart horizontal brackets having a plurality of spaced-apart axially-aligned apertures and secured to said lower surfaces of said upper horizontal members to provide said operator-selectable positions; wherein said first and second moveable end panels each further comprising opposed ends and a retaining rod removeably secured to each said opposed ends, whereby each of said retaining rods is inserted through said channels and removeably secured to each of said opposed ends of said moveable end panels to slideably secure said end panels to said side panels; and control pins for inserting into pairs of said axially-aligned apertures in each of said horizontal brackets and extending across each of said channels to provide said spaced stops by obstructing movement of said rods in said channels inwardly toward said central portion of said enclosure.

3. The apparatus as claimed in claim 1 wherein said enclosed area is rectangularly shaped.

4. The apparatus as claimed in claim 1 wherein said panels are rectangularly shaped.

5. The apparatus as claimed in claim 1 further comprising an adjustable horizontal member extending across and dividing said open upper section of each of said end panels.

6. An apparatus for controlling the feeding of livestock with bulk feed stored in the apparatus, said apparatus comprising:

spaced-apart first and second side panels, each having an open upper and a closed lower longitudinal section;

first and second end panels, each having an open upper and a closed lower longitudinal section, said first end panel being slideably attached to each of said side panels, and said second end panel being secured to each of said side panels opposite said first end panel to present an enclosed area, whereby said upper open section of each of said side and end panels provides limited access by said livestock to said bulk feed and said lower closed area of each of said side and end panels prevents said bulk feed from spilling from said enclosed area; and means on each of said first and second stationary side panels defining a series of spaced stops for said first end panel establishing a corresponding series of operator-selectable positions for said first end panel progressing inwardly to said enclosure along said side panels toward said second end panel.

7. The apparatus as claimed in claim 6 wherein said first and second side panels each further comprise upper and lower tracks for slideably securing said first end panel.

8. The apparatus as claimed in claim 7 wherein said upper tracks have axially-aligned spaced-apart apertures to provide said operator-selectable positions and further comprising control pins removeably insertable into said axially-aligned apertures and obstructing said tracks to provide said corresponding stops.

9. The apparatus as claimed in claim 6 wherein said enclosed area is rectangularly shaped.

10. The apparatus as claimed in claim 6 wherein said panels are rectangularly shaped.

11. The apparatus as claimed in claim 6 further comprising an adjustable horizontal member extending across and dividing said open upper section of each of said end panels.

12. The apparatus as claimed in claim 6 wherein said second end panel is slideably secured to said first and second side panels and moveable toward said first end panel along said first and second side panels.

13. An apparatus for controlling the feeding of livestock with bulk feed contained within the apparatus, said apparatus comprising:

an enclosed area for storing said bulk feed having spaced-apart first and second side panels and spaced-apart first and second end panels, said panels each having open upper and closed lower longitudinal sections;

said first end panel extending between and secured to said side panels;

said second end panel extending between and adjustably secured to said side panels; and means for providing operator-selectable adjustment positions along each of said side panels for controlled movement of said second end panel toward said first end panel.

14. The apparatus as claimed in claim 13 wherein said enclosed area is rectangularly shaped.

15. The apparatus as claimed in claim 13 wherein said panels are rectangularly shaped.

16. The apparatus as claimed in claim 13 further comprising an adjustable horizontal member extending across and dividing said open upper section of each of said end panels.

17. The apparatus as claimed in claim 13 wherein said first end panel is slideably secured to said first and second side panels and moveable toward said second end panel along said first and second side panels.

18. The apparatus as claimed in claim 13 wherein said adjustment positions are horizontally spaced-apart apertures along each of said side panels.

19. The apparatus as claimed in claim 18 wherein said means for controlled movement is control pins inserted in said apertures and obstructing movement of said end panels.

* * * * *